United States Patent [19]
Michelet

[11] 4,289,379
[45] Sep. 15, 1981

[54] OPTICAL SYSTEM HAVING A VARIABLE FOCAL LENGTH

[75] Inventor: Guy Michelet, Paris, France

[73] Assignee: Quantel S.A., France

[21] Appl. No.: 896,079

[22] Filed: Apr. 13, 1978

[30] Foreign Application Priority Data

Apr. 27, 1977 [FR] France .................. 77 12801
Mar. 29, 1978 [FR] France .................. 78 09152

[51] Int. Cl.³ .......................... G02B 3/14; G02F 1/29
[52] U.S. Cl. ............................. 350/419; 350/361
[58] Field of Search ................. 350/180, 360, 361

[56] References Cited
U.S. PATENT DOCUMENTS 3,161,718 12/1964 De Luca .................. 350/180
3,299,368 1/1967 Klebba .................. 350/360
3,442,570 5/1969 Picker .................. 350/360

OTHER PUBLICATIONS

McElroy, J. H. et al., "Laser Tuners Using Circular Piezoelectric Benders", Applied Optics, vol. 14, No. 6, Jun. 1975, 1297-1302.

*Primary Examiner*—Conrad J. Clark
*Attorney, Agent, or Firm*—Holman & Stern

[57] ABSTRACT

It comprises a container made at least partly from a transparent material and filled with an index adapting medium. At least one of the walls of the container through which the optical axis of the system extends comprises a piezoelectric multilayer structure for modifying the curvature of the wall in accordance with the voltage applied to the multilayer structure.

13 Claims, 8 Drawing Figures

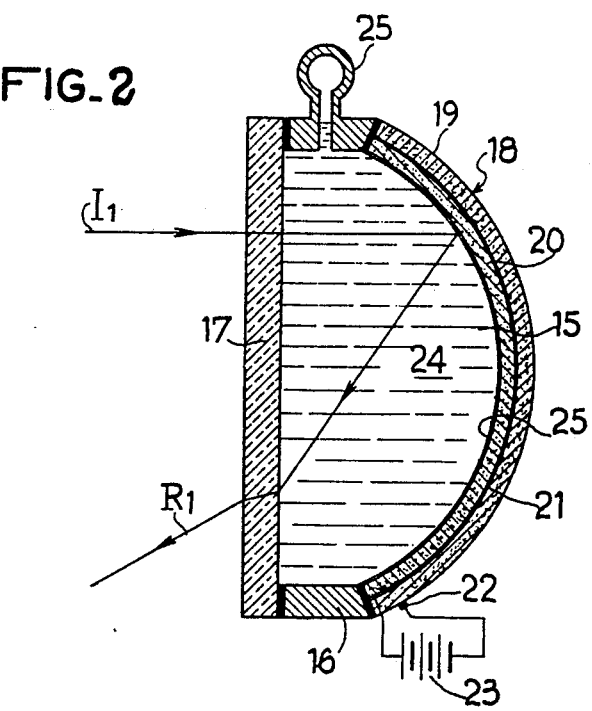
FIG_2
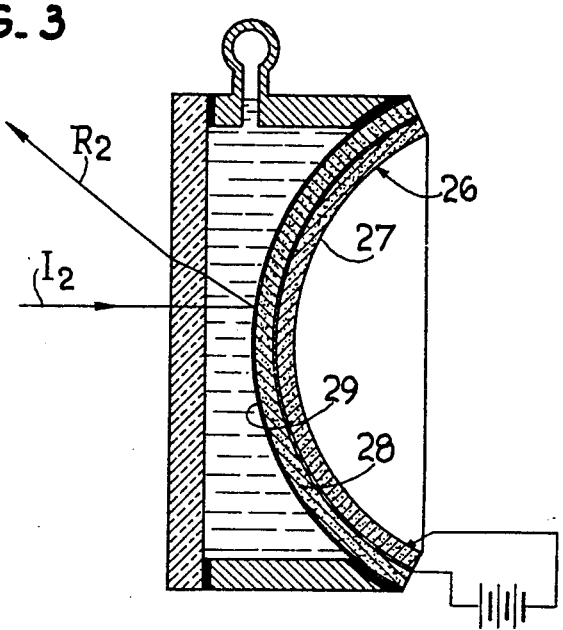
FIG_3

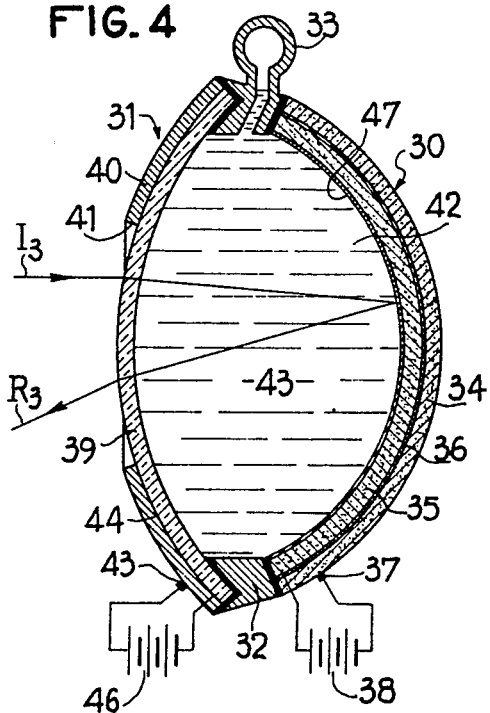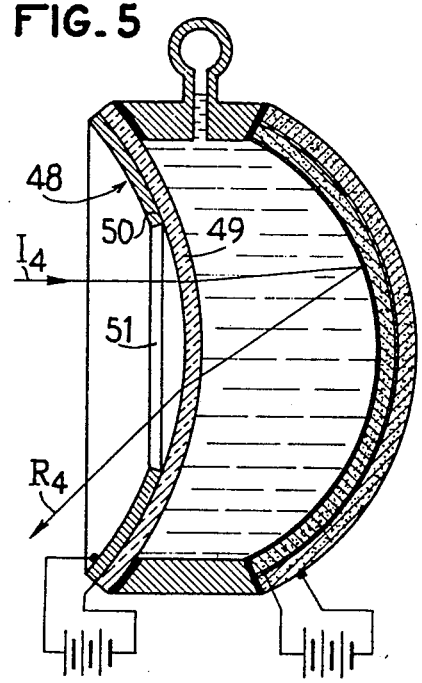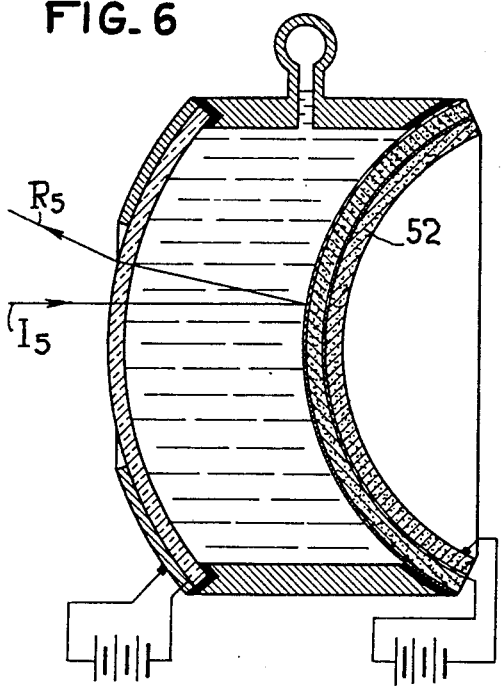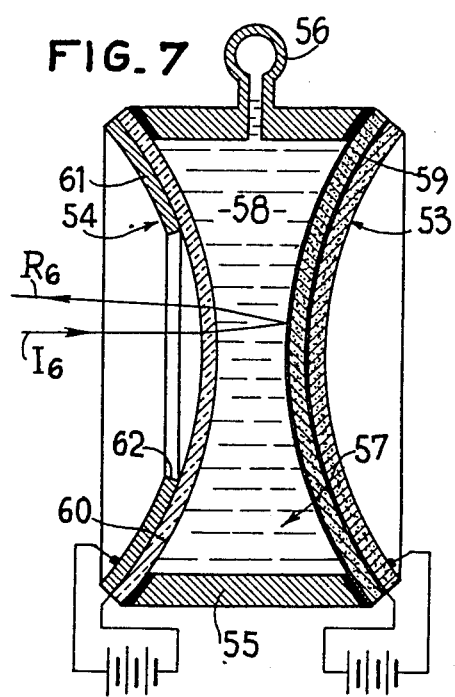

OPTICAL SYSTEM HAVING A VARIABLE FOCAL LENGTH

The present invention relates to optical systems and more particularly to lenses and catadioptric systems.

In French patent applications Nos. 77 12 799 and 77 12 800 owned by the Applicant the use of piezoelectric materials has been disclosed for the construction of optical elements having a variable focal length such as mirrors and lenses.

An object of the present invention is to provide a lens having a variable focal length and a special embodiment of a catadioptric system having a variable focal length.

According to the invention, there is provided an optical system having a variable focal length comprising a container at least partly of a transparent material and filled with an index adapting medium, at least one of the walls of said container through which the optical axis of the lens extends comprising a piezoelectric bimorph structure for modifying the curvature of said wall in accordance with the voltage applied to said bimorph structure.

According to a particular feature of the invention, the multilayer structure of piezoelectric material is constructed with transparent component layers.

According to another feature of the invention, with the multilayer structure constructed from opaque piezoelectric materials said wall comprises a strip of transparent material on which said bimorph structure is fixed, there being provided in the bimorph structure a window for the passage of the light.

Further features of the invention will be apparent from the ensuing description with reference to the accompanying drawings, which are given merely by way of example and in which:

FIG. 2 is a diagrammatic sectional view of a planar-concave catadioptric system having a variable focal length according to the invention;

FIG. 3 is a sectional view of a planar-convex catadioptric system having a variable focal length according to the invention;

FIG. 4 is a sectional view of a biconvex catadioptric system having two elements of variable curvature according to the invention;

FIG. 5 is a sectional view of a catadioptric system having two elements of variable curvature one of which is biconcave;

FIG. 6 is a sectional view of another embodiment of a catadioptric system similar to that shown in FIG. 5, and FIG. 7 is a sectional view of a concave-convex catadioptric system having two elements of variable curvature.

Figure 1:
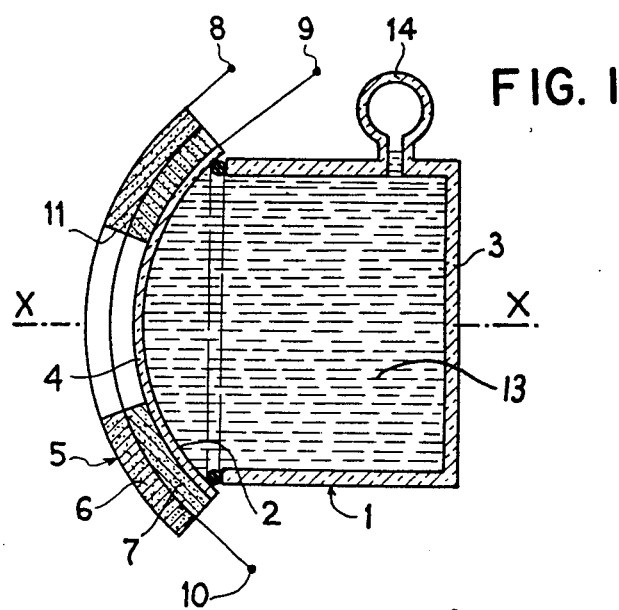
FIG. 1 is a diagrammatic view of a lens having a variable focal length according to the invention.

The lens shown in FIG. 1 comprises a container 1 of transparent material through the walls 2 and 3 of which extends the optical axis X—X of the lens.

The wall 2 of the container is formed by a strip 4 of transparent material on which is fixed a bimorph structure 5 of piezoelectric material formed by two elements or layers 6 and 7. The transparent strip 4 is for example made from silica.

Electrodes 8 to 10 are fixed to the elements 6 and 7 of the bimorph structure and to the surface of separation between these elements.

Formed in the centre part of the wall 2 surrounding the optical axis X—X there is a window 11 in the bimorph structure 5 to permit light to pass through the wall 2.

The wall 2 thus formed is secured to the rest of the container by a seal 12.

The container 1 has a planar wall 3 opposed to the wall 2 in the presently-described embodiment and is filled with an index adapting medium 13 which may be a gelatinous, liquid or other substance, for example silicone oil.

The lens comprises an expansion chamber 14 communicating with the container 1.

In the illustrated embodiment, the wall 3 of the lens is planar but it must be understood that this wall may have any curvature.

It may be formed by a wall similar to the wall 2.

When a voltage is applied to the terminals 8 to 10 of the wall 2, the bimorph structure is defomed and results in a curvature of the strip 4 which varies with the difference of potential at the terminals of the bimorph structure 2 so that the focal length of the lens is varied.

Figure 1A:
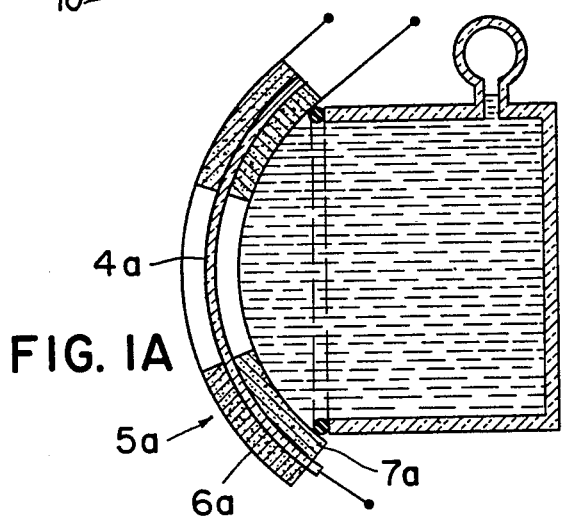
FIG. 1a is a diagrammatic view of another lens embodiment according to the invention.

In the illustrated embodiment, the strip 4 is fixed against an outer face of the bimorph structure 6, 7. As shown in FIG. 1a, this strip 4a may also be placed between the two elements 6a, 7a, of piezoelectric material 5a, each of which is provided with a window for the passage of light (FIG. 1a).

The wall may also be formed by a single piezoelectric element unitary with a strip of transparent material which does not have piezoelectric properties.

If the piezoelectric materials employed are transparent, the wall 2 of the lens may be formed simply by a bimorph structure. In this case, the flexible transparent strip 4 is unnecessary.

The catadioptric system shown in FIG. 2 comprises a container 15 formed by a lateral wall 16 and two end walls 17 and 18. The first end wall 17 is made from a rigid transparent material having a first index of refraction $n_1$ whereas the second end wall 18 is formed by a bimorph structure of a piezoelectric material comprising two elements or layers 19 and 20 separated by a layer of conductive material 21 constituting a first electrode for applying voltage to the couple. The outer face of the element 19 carries a second electrode 22 and a source of voltage 23 is connected to the terminals of the electrodes 21 and 22.

The container so constructed is filled with an index adapting medium 24 which may be a liquid, gelatinous or some other substance, for example silicone oil. The surface of the element 20 of the piezoelectric bimorph structure 18 is covered with a layer 25 of reflecting material.

The system so constructed therefore comprises a lens having a variable focal length formed by the medium 24 contained in the container 15 and a mirror having a variable focal length formed by the piezoelectric bimorph structure 18 provided with its layer of reflecting material 25.

Further, if the thickness of the rigid wall 17 of the container is non-negligible and if the index of refraction $n_1$ of the material from which it is made is different from the index of refraction $n_2$ of the medium 24, the system may be considered to comprise in addition a strip or layer having parallel faces constituted by said wall 17.

There is consequently provided a catadioptric system which deviates the incident rays $I_1$ and transforms them into reflected rays $R_1$ in the manner indicated in FIG. 2.

Of course, the deviation of the light rays produced by the wall 17 depends on the relative differences between the index $n_0$ of air, the index $n_1$ of the material of the wall 17 and the index $n_2$ of the medium 24.

The system shown in FIG. 2 also comprises an expansion chamber 25 communicating with the container 15.

The system shown in FIG. 3 is of a construction similar to that of the system shown in FIG. 2 except for the fact that, instead of comprising a concave mirror having a variable focal length it comprises a convex mirror having a variable focal length. This convex mirror is formed by a piezoelectric bimorph structure 26 comprising two elements or layers 27 and 28 whose concavity faces outwardly of the bimorph structure of the system, the inner element 28 having on the face thereof in contact with the index adapting medium contained in the container a coating 29 of reflecting material. The rest of the system is of a construction similar to that of the system shown in FIG. 2 and therefore will not be described in detail.

The planar-concave catadioptric system so constructed transforms the incident rays $I_2$ into reflected rays $R_2$ in the illustrated manner.

In the two embodiments just described, the transparent rigid wall of the container opposed to the wall formed by the piezoelectric bimorph structure is planar. However, it must be understood that this wall may also be concave or convex.

The catadioptric system shown in FIG. 4 differs from the preceding systems by the fact that it comprises the assembly of two piezoelectric bimorph structures 30 and 31 of variable curvatures fixed to a ring 32 which defines the lateral wall of the system and is provided with an expansion chamber 33. In the presently-described embodiment, the bimorph structure 30 is formed by two elements or layers 34 and 35 whose convexity faces outwardly of the system, these elements being separated by a layer 36 of conductive material connected to a first terminal for applying voltage to the couple. The outer face of the element 35 carries another voltage applying electrode 37. Voltage is applied to this bimorph structure by a first source of D.C voltage 38.

The second bimorph structure 31 comprises a strip or layer 39 of transparent material fixed to an element or layer 40 of piezoelectric material provided with a window 41 in the region surrounding the optical axis of the system for the passage of light.

The two elements 39 and 40 also have a concavity facing the exterior of the system. They are separated by a layer of conductive material 44 and the piezoelectric element 40 carries on its outer face an electrode 45 which forms, with the layer 44, the electrodes for applying a voltage to the bimorph structure 31 from a second source of voltage 46.

The face of the first bimorph structure 30 in contact with the index adapting medium 43 is covered with a layer 47 of reflecting material.

The system just described consequently comprises a lens having a variable focal length formed by the medium 43 contained in the container 42 defined by the two bimorph structures having variable curvatures 30 and 31 and a mirror having a variable focal length formed by the bimorph structure 30 carrying the layer of reflecting material 47. This system is, like the two preceding systems, a catadioptric system.

The system shown in FIG. 5 is similar in many respects to that shown in FIG. 4. It will therefore not be described in detail.

However, note that this system comprises a bimorph structure 48 which allows the light to pass therethrough and has a convexity facing toward the interior of the system whereas that of the corresponding bimorph structure 31 of the system shown in FIG. 4 faces outwardly. This bimorph structure 48 comprises an element or layer of piezoelectric material 50 in which a window 51 is formed for the passage of light.

The system shown in FIG. 5 differs from that shown in FIG. 4 only by the fact that it comprises a piezoelectric bimorph structure 52 forming a mirror having a variable focal length and having a concavity facing the exterior of the system, whereas the concavity of the corresponding bimorph structure of the system shown in FIG. 4 faces the interior of the latter. Otherwise, this system is similar to that shown in FIG. 4.

The system shown in FIG. 7 comprises two piezoelectric bimorph structures 53 and 54 whose concavities face outwardly. These bimorph structures are assembled with an annular lateral wall 55 provided with an expansion chamber 56. The two bimorph structures and the lateral wall 55 define a chamber 57 containing, as in the preceding cases, an index adapting medium 58. The bimorph structures 53 and 54 are of a construction similar to that of the previously-described corresponding bimorph structures. The bimorph structure 53 forming a mirror having a variable focal length carries a layer of reflecting material 59 whereas the bimorph structure 54 comprises an element or layer 60 of transparent material fixed to a piezoelectric element or layer 61 which is provided in the centre part thereof with a window 62 for the passage of light.

The system so constructed forms a biconcave catadioptric system having a variable focal length.

In the embodiments shown in FIGS. 4 to 7, the piezoelectric elements or layers of the bimorph structures transmitting the light are located outside the medium contained in the container of the system. However, it will be understood that the piezoelectric element may also be located in contact with said medium, that is to say on the inside.

Moreover, this piezoelectric element may be replaced by a bimorph structure formed by two piezoelectric elements or layers to which a transparent strip is fixed. The two elements of the bimorph structure are then provided with a window for the passage of light.

The disclosure of aforementioned French patent application No. 77 12 799 is inserted in this disclosure by reference.

French patent application No. 77 12 799 discloses merely by way of example the following list of piezoelectric materials suitable for the optical elements of the invention.

For the mirrors:
Barium titanates
Calcium titanates
Strontium titanates
Tantalum titanates
For the lenses:
Quartz
Seignette salt
Potassium monophosphates
Rubidium monophosphates
Ceasium monophosphates French patent application No. 77 12 799 also cites an article by J. H. McElroy, P. E. Thompson, H. E. Walker, E. H. Hohnson, D. J. Radecki and R. S. Reynolds, entitled "Laser tuners using circular piezoelectric benders" in the American review Applied Optics, volume 14, No. 6, June 1975, which gives further information on the construction and use of a bimorph structure as a bender.

Having now described my invention, what I claim as new and desire to service by Letters Patent is:

1. An optical system having a variable focal length, comprising a container defined by walls at least a part of which walls is of transparent material, an index adapting medium filling said container, the optical system having an optical axis which extends through at least a first of said walls, at least said first wall of said walls comprising a piezoelectric bimorph structure comprising interconnected adjoining layers and means for applying voltage to said interconnected layers for modifying the curvature of said first wall in accordance with the voltage applied to the bimorph structure through said voltage applying means.

2. An optical system as claimed in claim 1, wherein the bimorph structure is made from a transparent material.

3. An optical system as claimed in claim 1, wherein the bimorph structure comprises at least one component layer of opaque material and there is provided a strip of transparent material on which said bimorph structure is fixed, a window for the passage of light being provided in said bimorph structure.

4. An optical system as claimed in claim 3, wherein said strip of transparent material is one of the component layers of the piezoelectric bimorph structure.

5. An optical system as claimed in claim 3, wherein said strip of transparent material is fixed to an outer surface of a layer of the bimorph structure which comprises two layers of piezoelectric material.

6. An optical system as claimed in claim 3, wherein the transparent strip is fixed between two layers of piezoelectric material constituting said bimorph structure.

7. An optical system as claimed in claim 1, 2 or 3, wherein the container comprises an expansion chamber for the index adapting medium.

8. An optical system as claimed in claim 1, 2 or 3, which constitutes a lens having a variable focal length.

9. A catadioptric system having a variable focal length, comprising a container defined by walls at least a part of which walls is of transparent material, an index adapting medium filling said container, the optical system having an optical axis which extends through at least a first of said walls, at least said first wall of said walls comprising a piezoelectric bimorph structure comprising interconnected adjoining layers and means for applying voltage to said interconnected layers for modifying the curvature of said first wall in accordance with the voltage applied to the bimorph structure through said voltage applying means, said bimorph structure having a reflecting surface which is in contact with the index adapting medium contained in the container.

10. An optical system as claimed in claim 9, wherein said reflecting surface of the piezoelectric bimorph structure is formed by a layer of reflecting material deposited on a layer of the bimorph structure in contact with the index adapting medium.

11. An optical system as claimed in claim 9 or 10, wherein said container comprises a rigid transparent wall in facing relation to said first wall comprising said bimorph structure along the optical axis of said system.

12. An optical system as claimed in claim 9 or 10, wherein said container comprises in facing relation to said first wall comprising said bimorph structure a second piezoelectric bimorph structure having a variable curvature, at least a region of said second bimorph structure surrounding said optical axis of the system and being transparent to light.

13. An optical system as claimed in claim 12, wherein said second piezoelectric bimorph structure comprises at least one component layer of opaque material a strip of transparent material, and a window for the passage of light in said component layer of opaque material.

* * * * *